Aug. 17, 1965 W. WHITE 3,200,701

METHOD FOR OPTICAL COMPARISON OF SKIN FRICTION-RIDGE PATTERNS

Filed Jan. 29, 1962 2 Sheets-Sheet 1

WYMAN WHITE
INVENTOR.

BY H. C. Goldwire

AGENT

WYMAN WHITE
INVENTOR.
BY H.C. Goldwire
AGENT 3,200,701
METHOD FOR OPTICAL COMPARISON OF SKIN FRICTION-RIDGE PATTERNS Wyman White, Dallas, Tex., assignor to Ling-Temco-Vought, Inc., Dallas, Tex., a corporation of Delaware Filed Jan. 29, 1962, Ser. No. 169,454
2 Claims. (Cl. 88—14)

This application is a continuation-in-part of my co-pending application Serial No. 2,531, filed on January 14, 1960, entitled "Device for Optical Image Production and Comparison," now abandoned.

This invention relates to the recording and comparison of an image of the raised portions or ridges of an uneven surface and more particularly to the electronic recording and comparison of an optical image of the raised portions (i.e., friction ridges and the like) of a skin surface.

It has been found that significantly superior results are obtained, in making fingerprints and the like, when the image of the pattern of the finger surface or other skin area is made by optical methods such as described in the above co-pending application. The resulting image is of highly superior resolution and clearly shows details, such as pores, which are entirely lost when a print is made graphically from an inked finger. While visual comparison of the optical image with a visible reference image is readily effected by means described in the above-mentioned application, it would be desirable to eliminate the human factor insofar as is possible in making the comparison and thus to obtain in a minimum of time a completely objective and more accurate establishment of the presence or absence of identity between the optical and reference images.

It is, accordingly an object of the present invention to provide a method for comparing a skin friction-ridge pattern with a reference friction-ridge pattern.

Still further objects and advantages will be apparent from the specification and claims and from the accompanying drawing illustrative of the invention.

Figure 1:
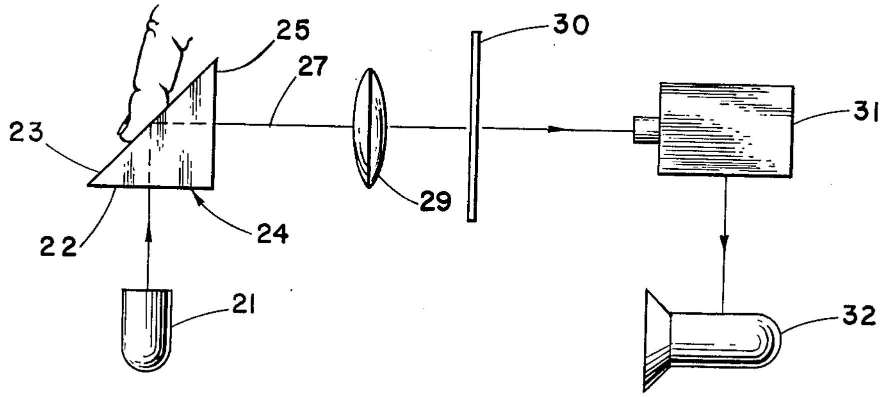
FIGURE 1 is a schematic presentation of the image unit and a scanner.

With reference to FIGURE 1, the image unit basically comprises a light source 21 and prismatic body 24 with which preferably are associated a lens 29 and screen 30 which is frosted or translucent in order that an image produced by light falling on its front side from the lens 29 will be visible, at its back side, to the scanner 31. Light entering the transparent body through surface 22 falls at a supercritical angle upon the surface 23 and, where surface 23 is not contacted by a skin surface (e.g., a friction ridge of a finger), is reflected back through the transparent body 24 and passes through the surface 25 and lens 29 to the screen 30. Where the surface 23 is contacted by a skin area, much of the light passes through the surface 23 and is absorbed by the finger. In addition, the index of refraction at the skin-contacted area is changed with the result that any light which is reflected does not pass as along the line 27 to the lens 29 and screen 30. As a consequence, an optical image is produced directly from the finger friction-ridge pattern; falling on the screen 30, this pattern is typified by black or dark areas representing the friction ridges, etc. and light areas representing the floors of pores and the valleys between the friction ridges. The scanner 31 scans the image in the reflected rays and emits an electrical signal representative of the optical image and hence of the friction-ridge pattern. The emitted signal may be supplied to various electronic instruments of which the cathode ray tube 32 is an example. The scanner 31 is inclusive of the various modes of scanning explained in connection with FIGURES 3 and 4.

Figure 2:
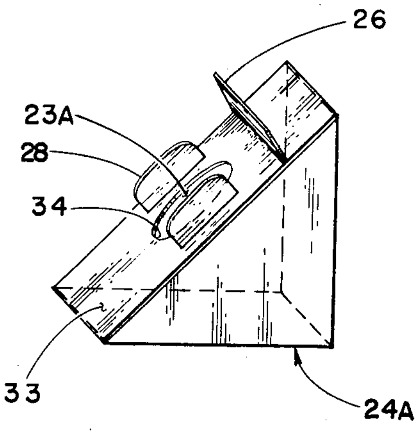
FIGURE 2 is a perspective view of a modified form of the transparent body shown in FIGURE 1.

For precise electronic comparison of the electrical representation of the optical image of the friction-ridge pattern with a previously acquired electrical representation of the friction-ridge pattern, the same area of the finger must be represented each time; hence, the finger must be precisely located on the contacting surface of the transparent body 24. For this purpose, there are provided finger guide means 26, 28 (FIGURE 2) which, for example, comprise ridges raised from the surface of the finger-contacting surface 23A and arranged to control location of the finger in the lateral and axial senses. In order that the compared area will be of the same size in each case, the finger-contacting surface 23A is rendered opaque except in the desired area of contact with the finger. This is effectively accomplished by covering the surface with an opaque plate 33 which has an opening 34 in the area of desired finger contact and which conveniently is integral with the guide ridges 26, 28. The opening 34 limits the area of finger contact with the transparent body surface 23A, while the guide ridges 26, 28 determine the location of the area on the finger.

Figure 3:
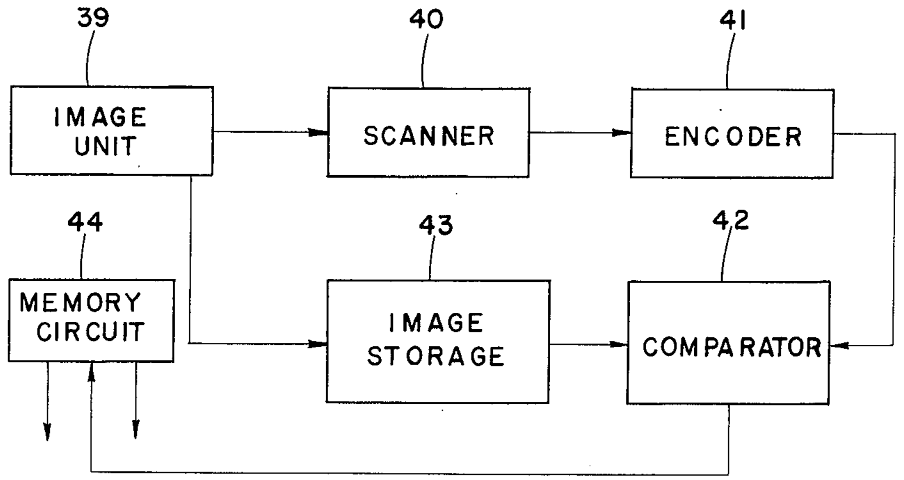
FIGURE 3 is a diagrammatic view of the electronic image comparator.

FIGURE 3 illustrates the electronic image comparator basically comprising an image unit 39, scanner 40, image representation storage unit 43, and comparator 42. Also shown are an analog-to-digital encoder 41 and a memory circuit 44. With added reference to FIGURE 1, the image unit of FIGURE 3 comprises the light source 21 and prismatic body 24 and, where employed, the lens 29 and screen 30. The image produced on the screen 30 is viewed by the scanner unit 40.

The scanner unit 40 utilizes one, two, or all three of three types of scanners for producing an electrical signal or signals representative of the optical image projected onto the screen 30. These preferably operate serially: the image is scanned by the first, then the second, then the third scanner. In each case, an electrical signal is produced which is representative of the friction-ridge pattern of the finger from which the optical image is produced, and these are compared with stored, previously acquired signals representative of a friction-ridge pattern. The stored reference signals may or may not represent the same friction-ridge pattern as that represented by the acquired signals, and it is the purpose of the comparison to produce an electrical signal indicative of the presence or absence of identity as determined by electronic comparison of the two sets of signals. One of the scanners produces an analog signal indicative of the position of a line across the image dividing the image into two areas having a predetermined light intensity ratio, e.g., two areas of equal light intensity, etc. Another scanner provides an analog signal indicative of the light intensity ratio between two arbitrarily chosen, fixed areas on the image. The third scanner is a typical flying-spot scanner utilizing a cathode ray tube to provide scanning of lines (straight, curved, angled, etc.) arbitrarily formed and falling in predetermined location across the image. The third scanner gives a signal (such as a voltage signal) whose amplitude varies in accordance with light intensity as determined by the darkness of the ridges and lightness of the valleys crossed; that is, it produces an analog representation of the friction ridge pattern scanned.

The three, successive analog signals from the scanning unit 40 are three different-aspect representations of the optical image of the friction-ridge pattern and are supplied to a conventional and suitable analog-to-digital encoder 41, where the analog representations are converted into three, successive digital signals.

From the encoder 41, the signals, now in digital form, pass to the comparator 42. The latter is a conventional electronic comparator for comparing two digital inputs. One of the inputs to the comparator 42 comprises the three digital signals from the encoder 41.

The storage unit 43, which is activated at the same time as the scanner unit 40 upon production of an image by the optical image unit 39, is a conventional magnetic tape or drum information storage and play-back device. The storage unit 43 stores a record, in digital form, of a reference image subjected to the three types of scanning employed on the optical image. The output of the storage unit 43 thus is similar to the signals representative of the optical image and forms the second input to the comparator 42. The comparator 42 compares the two sets of input signals and sends three successive signals, indicative of the results of the three comparisons, to the memory circuit 44.

The memory circuit 44 consists of standard circuits employing units such as relays or flip-flops which require two pulses of like sign in order to give an output. For example, the elements are arranged so that favorable comparison in the comparator 42 (i.e., the event of the two inputs to the comparator being found identical for a given signal) results in delivery of a positive pulse from the comparator 42 to the memory circuit 44 which, upon at least a second occurrence, produces an output from the flip-flop attached to the memory circuit terminal for affirmative comparison.

In the example, three comparisons are used, and an affirmative comparison from two of the three signals is sufficient for production by the memory circuit 44 of an affirmative signal. In other embodiments, more than two affirmative comparisons may be required in order to obtain an affirmative signal from the memory circuit 44. Signals which may be utilized for more than three comparisons can be obtained by additional scanners rotated with respect to the three scanners of the scanner unit 40 of FIGURE 3.

Figure 4:
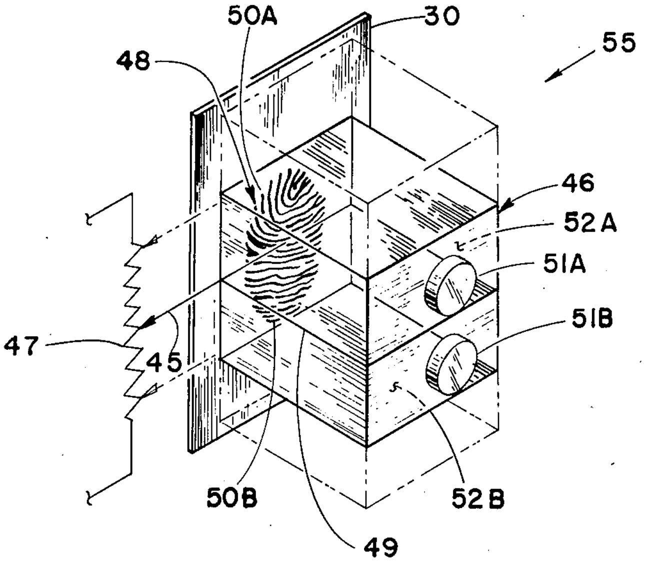
FIGURE 4 is a schematic view of a form of scanner useable in the device shown in FIGURE 3.

In FIGURE 4, the screen 30 (shown also in FIGURE 1) has an optical image 48 projected thereon, and the scanner 55 is provided for producing an electrical signal analogous to the friction-ridge pattern depicted in the image. The scanner 55 shown by way of specific example scans the image 48 and ascertains the location of a line dividing the image into two areas of predetermined light intensity ratio. In the image 48 shown in the example, the ridges appear as dark, substantially black areas; therefore, the intensity of light reflected from various areas of the image varies with variation in the proportion of ridge area to groove area. If the image 48 is divided into two areas of a predetermined light intensity ratio, the relative sizes of the areas will vary among various friction-ridge specimens; thus, the location of a line dividing the image into these two areas will be varied in position. Where this line is similarly located on the optical image 48 and on a reference image, there is the possibility of identity between the two images; variation in location of the line is an indication of lack of identity between the optical image and a reference image.

The enclosure 46 is positioned adjacent the screen 30 and comprises two cavities 52A, 52B separated by a partition 49. The broken lines indicate movement of the enclosure 46 across the image 48, which movement preferably is accomplished by a conventional servomotor (not shown) until the partition 49 divides the image into two areas 50A, 50B with light intensities of a selected ratio. The light intensity ratio of the area 50A of the image 48 viewed on one side of the partition 49 to the area 50B of the image viewed on the other side of the partition is ascertained by a pair of photocells 51A, 51B which are situated opposite the image in the respective ends of the two cavities 52A, 52B formed by the partition in the enclosure 46. For ascertaining their relative outputs, the photocells 51A, 51B may be inserted in two arms of a bridge circuit (not shown) such as a Wheatstone bridge. Values in the bridge circuit are chosen so that balance of the bridge circuit is obtained when the predetermined light intensity ratio is obtained in the two areas 50A, 50B viewed by the photocells 51A, 51B. Null of the bridge circuit stops the servomotor and hence the enclosure 46 in the position in which the partition 49 lies on the line dividing the image 48 into the two areas 50A, 50B of chosen light intensity ratio.

A pickoff (i.e., the wiper 45 of a potentiometer) is attached to the enclosure 46 and moves up and down the potentiometer resistance 47 in accordance with motion of the enclosure. At null of the bridge circuit, the pickoff 45 provides an analog signal representative of the position of the enclosure 46 and peculiar to the particular image 48 being scanned.

The form of the enclosure 46 may be modified to vary the shape of the area of the image 48 viewed by each photocell 51A, 51B. A modified form of scanning is provided by placing the enclosure 46 in a predetermined, abitrary position and determining, in this fixed position, the ratio of the light intensities of the areas of the image lying on the opposite sides of the partition 49.

While only one embodiment of the invention has been described in detail herein and shown in the accompanying drawing, it will be evident that various modifications are possibe in the arrangement and construction of its components and in the steps of the method without departing from the scope of the invention.

I claim:

1. A method for comparing the friction-ridge pattern of a portion of skin with a reference friction-ridge pattern comprising: producing an optical image of the friction-ridge pattern directly from skin containing the friction-ridge pattern; projecting the optical image on a screen; serially performing a plurality of scanning operations of different types on the optical image thereby producing a first plurality of electrical signals directly representative of the optical image; generating a second plurality of electrical signals directly representative of the reference friction-ridge pattern and each corresponding to the different types of scanning operations; performing a series of comparisons in each of which a respective one of the first plurality of electrical signals is compared with a respectively corresponding one of the second plurality of electrical signals; producing a plurality of electrical signals each of which is indicative of the results of a respective one of said comparisons and which is affirmative when said results are indicative of identity between the friction-ridge pattern and reference friction-ridge pattern; and, upon at least two of the last-named signals being affirmative, producing a signal indicative of identity between the friction-ridge pattern and reference friction-ridge pattern.

2. A method for comparing the friction-ridge pattern of a portion of skin with a reference friction-ridge pattern comprising: producing an optical image of the friction-ridge pattern directly from skin containing the friction-ridge pattern; projecting the optical image on a screen; producing a first electrical signal indicative of the position of a line extending across the optical image and dividing the same into two areas having a predetermined light intensity ratio; producing a second electrical signal indicative of the light intensity ratio of two predetermined, fixed areas of the optical image; producing a third electrical signal indicative of light intensity variations along at least one line of fixed, known location and shape and having extension across the optical image; making a first comparison in which the first electrical signal is compared with an electrical signal indicative of the position of a line extending across the reference pattern and dividing the same into two areas having a predetermined light intensity ratio and producing an affirmative signal when the results of the first comparison are indicative of substantial correspondence between the first signal and said signal with which it is compared; making a second comparison in which the second electrical signal is compared with an electrical signal indicative of the light intensity ratio of two predetermined, fixed areas of the reference pattern corresponding to the two predetermined, fixed areas of the optical image and producing an affirmative signal when the results of the second comparison are indicative of substantial correspondence between the second signal and said signal with which it is compared; making a third comparison in which the third electrical signal is compared with an electrical signal indicative of light intensity variations along at least one line having extension across the reference pattern and having a shape and fixed location corresponding to the shape and fixed location of the line extending across the optical image and producing an affirmative signal when the results of the third comparison are indicative of substantial correspondence between the third signal and said signal with which it is compared; and upon the occurrence of at least two of said affirmative signals, producing a signal indicative of identity between the friction-ridge pattern and the reference friction-ridge pattern.

References Cited by the Examiner

UNITED STATES PATENTS

| | | | |
|---|---|---|---|
| 2,085,935 | 7/37 | Widenham | 88—14 |
| 2,195,699 | 4/40 | Johnson | 88—24 |
| 2,936,607 | 5/60 | Nielson. | |
| 2,952,181 | 9/60 | Maurer | 88—14 |

FOREIGN PATENTS

| | | |
|---|---|---|
| 432,240 | 7/26 | Germany. |
| 473,804 | 3/29 | Germany. |

JEWELL H. PEDERSEN, *Primary Examiner.*